United States Patent
Falken

(10) Patent No.: US 9,684,185 B2
(45) Date of Patent: Jun. 20, 2017

(54) THERAPEUTIC EYEWEAR FRAME

(71) Applicant: EFFEKT LLC, Solana Beach, CA (US)

(72) Inventor: Robert Falken, Oceanside, CA (US)

(73) Assignee: Effekt LLC, Solana Beach, CA (US)

( * ) Notice: Subject to any disclaimer, the term of this patent is extended or adjusted under 35 U.S.C. 154(b) by 0 days.

(21) Appl. No.: 14/732,563

(22) Filed: Jun. 5, 2015

(65) Prior Publication Data

US 2015/0355478 A1    Dec. 10, 2015

Related U.S. Application Data

(60) Provisional application No. 62/008,815, filed on Jun. 6, 2014.

(51) Int. Cl.
| | |
|---|---|
| *G02C 1/00* | (2006.01) |
| *G02C 5/00* | (2006.01) |
| *G02C 5/12* | (2006.01) |
| *G02C 5/14* | (2006.01) |
| *G02C 11/00* | (2006.01) |
| *G02C 13/00* | (2006.01) |

(52) U.S. Cl.
CPC ............ *G02C 5/001* (2013.01); *G02C 5/12* (2013.01); *G02C 5/146* (2013.01); *G02C 11/00* (2013.01); *G02C 13/001* (2013.01)

(58) Field of Classification Search
CPC ........................................................ G02C 1/00
USPC ...... 351/158, 41, 121, 111, 136, 124; 600/9, 600/15; 128/206.12, 793
See application file for complete search history.

(56) References Cited

U.S. PATENT DOCUMENTS

| | | |
|---|---|---|
| 4,744,646 A | 5/1988 | Stewart |
| 6,746,117 B1 | 6/2004 | Wang |
| 2004/0173216 A1 | 9/2004 | Park |
| 2005/0062931 A1 | 3/2005 | Takeuchi |
| 2012/0226095 A1 | 9/2012 | Young |
| 2013/0069274 A1 | 3/2013 | Zhang et al. |

FOREIGN PATENT DOCUMENTS

| | | | | |
|---|---|---|---|---|
| CN | 2671614 Y | | 1/2005 | |
| CN | 101311212 A | | 11/2008 | |
| JP | 10020256 A | * | 1/1998 | ............... G02C 5/00 |
| JP | 11299515 A | * | 11/1999 | ............... G02C 11/00 |
| JP | 2004184954 A | * | 7/2004 | ............... G02C 11/00 |

* cited by examiner

*Primary Examiner* — Hung Dang
(74) *Attorney, Agent, or Firm* — Mintz Levin Cohn Ferris Glovsky and Popeo, P.C.

(57) ABSTRACT

A therapeutic eyewear frame is disclosed. A therapeutic agent is integrated with one or more frame before, during or after forming a material into the frame, the therapeutic agent having between 100 and 10,000 negative ions per cubic centimeter.

18 Claims, 2 Drawing Sheets

THERAPEUTIC EYEWEAR FRAME

CROSS REFERENCE TO RELATED APPLICATIONS

The current application claims priority under 35 U.S.C. §119(e) to U.S. Provisional patent application Ser. No. 62/008,815, filed on Jun. 6, 2014, the contents of which are hereby fully incorporated by reference.

BACKGROUND

Of late, considerable interest has arisen in the claimed therapeutic effects of negative ions, particularly for improving athletic performance and increased blood circulation in a person. Recently published reports indicate that there well may be some merit to these claims.

Negative ions are odorless, tasteless, and invisible molecules that are inhaled or absorbed by a person in certain environments. Examples of environments rich in negative ions are areas containing waterfalls, crashing waves on beaches, or clean mountain air. Once negative ions reach a persons bloodstream, they are believed to produce biochemical reactions that increase levels of the mood enhancing chemical serotonin, helping to alleviate depression, relieve stress, and improve a persons sense of well being and happiness. The understanding that human beings are bioelectric in nature, and electrically charged particles affect the way a person feels and acts supports this.

Several thousand scientific documents based on research in Israel, Europe, and in Asia support the concept that high doses of negative ions emit positive physical, physiological and/or emotional effects on a person, while the opposite is true when a person is exposed to high amounts of positive ions. Recent research has shown that negative ions may also protect against germs in the air, resulting in decreased irritation due to inhaling various particles that make a person sneeze, cough, or have a throat irritation.

While a number of consumer wearable products offered as an emitting source of negative ions have appeared on the market within recent years, none have been effective in positioning an ideal amount of negative ion emission near neurotransmitters in the wearer's brain.

SUMMARY

A therapeutic eyewear frame for improving the sense of well-being and happiness of a wearer and a method of using the eyewear is disclosed. The therapeutic eyewear frames contain an anion (negative ion) emitting material or substance that is integrated with the eyewear frames in the manufacturing process, and which can release negative ions around the wearers face and head. The method includes wearing the eyewear for a sufficient period of time, thereby stimulating the wearer to achieve an improvement in their sense of well-being and happiness.

Moreover, a wearer of therapeutic eyewear as disclosed herein is more likely to inhale and absorb large quantities of negative ions, since the therapeutic eyewear frames rest on the wearer's face in close proximity to the wearer's mouth and nose, in addition to the beneficial absorption through the wearer's head.

In one aspect, a therapeutic eyewear frame includes a frame front having a right end piece and a left end piece, a right temple connected with the right end piece, and a left temple connected with the left end piece. The therapeutic eyewear frame further includes a therapeutic agent integrated with one or more of the right temple, the left temple, and/or the frame front, the therapeutic agent having between 100 and 10,000 negative ions per cubic centimeter.

In another aspect, an apparatus include an eyewear frame having a frame front having a right end piece and a left end piece, the eyewear frame for supporting one or more lenses. The apparatus further includes a therapeutic agent integrated with the eyewear frame, the therapeutic agent having between 100 and 10,000 negative ions per cubic centimeter.

In yet another aspect, a method includes providing a base material for an eyewear frame, and forming the eyewear frame from the base material, the eyewear frame being formed into at least a frame front for supporting and at least partially framing one or more lenses. The method further includes integrating a therapeutic agent with the frame front during or after the forming, the therapeutic agent having between 100 and 10,000 negative ions per cubic centimeter. In still yet another aspect, the method further includes wearing the eyewear frame by a user for a time sufficient to absorb negative ions from the therapeutic agent into the user's body.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes therapeutic eyewear frames. A therapeutic eyewear frame for improving the sense of well-being and happiness of a wearer and a method of using the eyewear is disclosed. In some implementations, eyewear frames include a frame front having a right end piece and a left end piece. The frame front supports and at least partially frames one or more lenses. The eyewear frames can further include a right temple connected with the right end piece, and a left temple connected with the left end piece. In preferred exemplary implementations, therapeutic eyewear frames include a therapeutic agent integrated with one or more of the right temple, the left temple, and/or the frame front, the therapeutic agent having between 100 and 10,000 negative ions per cubic centimeter.

Figure 1:
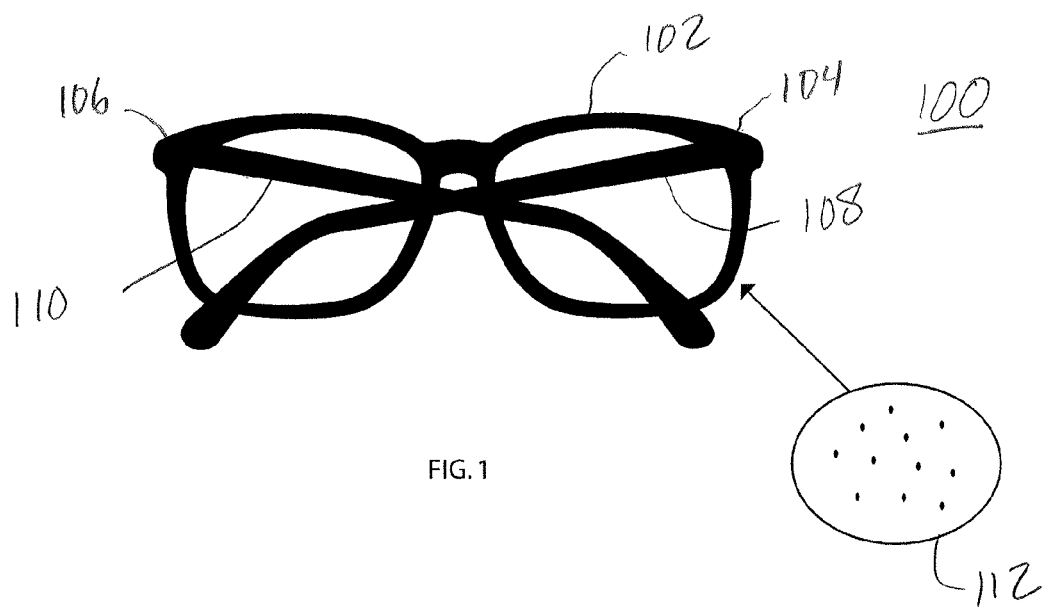
FIG. 1 illustrates a pair of negative ion containing therapeutic eyewear frames without nose pads.

FIG. 1 illustrates a pair of negative ion containing therapeutic eyewear frames 100 without nose pads. The therapeutic eyewear frames 100 include a frame front 102 having a right end piece 104 and a left end piece 106. The frame front 102 supports and frames one or more lenses. The eyewear frames further include a right temple 108 connected with the right end piece 104, and a left temple 110 connected with the left end piece 106. Each of the right temple 108 and left temple 110 can include an ear bridge at its distal end. The therapeutic eyewear frames 100 include a therapeutic agent 112 integrated with one or more of the right temple 108, the left temple 110, and/or the frame front 102, the therapeutic agent having between 100 and 10,000 negative ions per cubic centimeter. In certain preferred exemplary implementations, the frames 100 include about 2,000 negative ions per cubic centimeter of frame mass or frame material volume.

Figure 2:
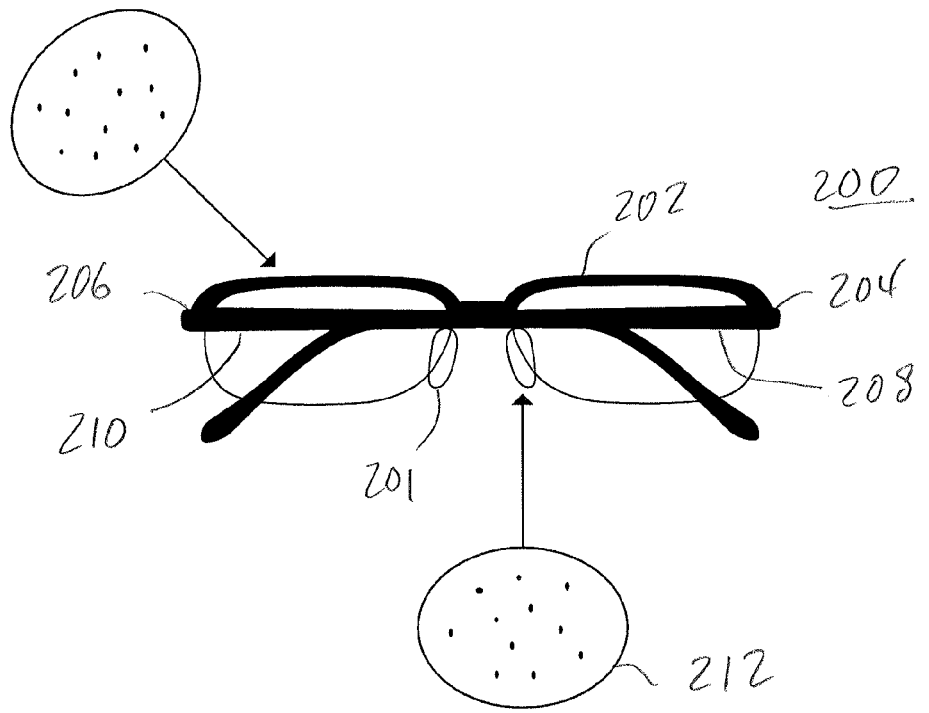
FIG. 2 illustrates a pair of negative ion containing therapeutic eyewear frames with nose pads.

FIG. 2 illustrates a pair of negative ion containing therapeutic eyewear frames 200 with nose pads 201. The therapeutic eyewear frames 200 include a frame front 202 having a right end piece 204 and a left end piece 206. The frame front 202 supports and frames one or more lenses. The eyewear frames further include a right temple 208 connected with the right end piece 204, and a left temple 220 connected with the left end piece 206. Each of the right temple 208 and left temple 220 can include an ear bridge at its distal end. The nose pads 201 of the therapeutic eyewear frames 200 can be attached to and extending from the frame front 202, or directly to the lenses framed by the frame front 202. The therapeutic eyewear frames 200 include a therapeutic agent 212 integrated with one or more of the right temple 208, the left temple 210, the frame front 202, and/or, the nose pads 201, the therapeutic agent having between 100 and 10,000 negative ions per cubic centimeter of frame mass or frame material volume.

The therapeutic eyewear frames contain an anion (negative ion) emitting material or substance that is integrated with the eyewear frames in the manufacturing process, and which can release negative ions around the wearers face and head. The method includes wearing the eyewear for a sufficient period of time, thereby stimulating the wearer to achieve an improvement in their sense of well-being and happiness.

In some implementations, negative ions are embedded into the plastic formulation that makes up the eyewear frames. In some particular implementations, a negative ion composition is used for the basis of the ideal negative ion containing eyewear frame formulation. One example of a negative ion containing composition includes the use of tourmaline powder that is a crushed or pulverized form of tourmaline, a semi-precious natural gemstone mineral with a high natural output of negative ions. The preferred tourmaline powder of this implementation may contain any ratio of 1% to 60% by weight of the plastic formulation, to ensure that the emitting negative ions of the implementation release at a concentration between 100 and 10,000 negative ions per cubic centimeter. The tourmaline powder may be included directly into the plastic matrix formula of the therapeutic eyewear frames at the point of manufacture.

In some implementations, a blend of negative ion powders can be utilized in the formulation. The negative ion powder may consist of a blend of any of germanium, silicon oxide, alumina, rare earth, and tourmaline. Additionally, any type of negative ion emitting substance may be utilized. Additional examples of this are bio-ceramic materials such as silica, aluminum, magnesium, or rare earth magnets, which can be used in various forms.

In some alternative implementations, the negative ion portion of the therapeutic eyewear frame may be coated onto the pre-formed plastic or metal frame. A powder-coated layer being applied to the frame member achieves this with a negative ion agent disposed in the powder coat layer. In yet other implementations, the negative ion portion of the formulation may be dip-coated onto a pre-formed therapeutic eyewear frame.

The therapeutic eyewear frames may be manufactured of one or more plastics. In particular, plastics such as zylonite (cellulose acetate or "Zyl") in either solid or laminated structures, permits a layered or mottled coloring and negative ion coating. Propionate, a nylon-based plastic that is hypoallergenic, also is used for its lightweight and unique look and feel. Because of potential brittleness and other problems, eyewear can be manufactured using blended nylon, such as polyamides, co-polyamides and gliamides.

In some implementations, an eyewear frame can be formed of metal, and the negative ion agent can be applied or integrated in any of a variety of ways. By way of example and not limitation, such metals can include Monel® (a mixture of any of a broad range of metals); titanium; alloys that are combinations of titanium and other metals, such as nickel or copper; beryllium; stainless steel; TiCrAl and Flexon® (titanium alloys); and aluminum and aluminum alloys.

Ancillary frame elements can include nose pads, ear pads, and the like. Nose pads are mounted at the nose bridge and serve two primary functions: to increase frictional resistance to prevent the eyeglasses sliding down the wearer's nose, and to reduce discomfort associated with long-term pressure of the eyeglasses of the bridge of the wearer's nose. Pads can be made of a low-durometer plastic or polymer, such as silicone, polyvinyl chloride, and other suitable polymers.

Polymeric elements also can be affixed to the frame temples to increase friction and help retain the eyewear on the wearer's head. Such elements, sometimes referred to as "temple tips", generally are constructed of softer, higher-tack polymeric compositions than the material of the eyeglass frame itself.

Nose pads, temple tips, and the like also can have incorporated therein one or more negative ion agents. As these elements are in direct and constant contact with the wearer's skin, they benefit greatly from an added negative ion property.

In some implementations, plastic pellets can be injection moulded with a given load weight ratio of negative ion emitting powder or negative ion masterbatch into a pre-formed mould. The negative ion masterbatch can be a pellet of carrier resin containing negative ion powder. This method simplifies the manufacturing process by pre-homogenizing the powder.

In other implementations, an injection moulding process of the frames is completed first by forming molten plastic into a pre-formed shape of the frame or frame components. Next, a coating of paint containing negative ion powder is applied to the pre-formed frames in a gloss coat or matte finish.

Still another method includes mixing negative ion powder in a given load weight ratio into a cellulose acetate resin for pressing into sheets, and then manufacturing a frame by punch press or computer numeric control (CNC) router, and/or hand sculpting and finishing. Regarding cellulose acetate material, pre-formed frames can be lacquer coated with a given load weight ratio of negative ion emitting powder contained within the lacquer.

Figure 3:
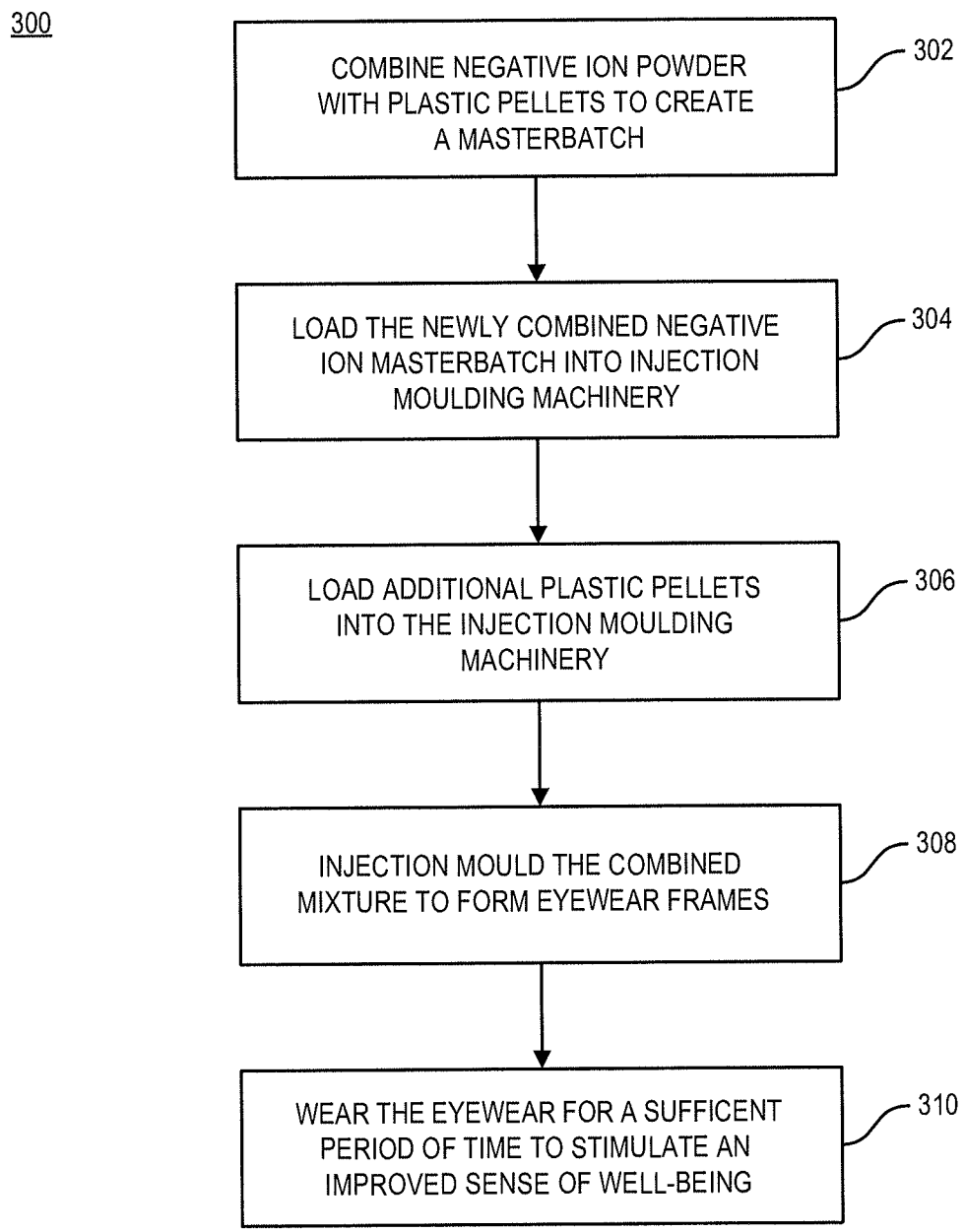
FIG. 3 is a flowchart of method of manufacturing therapeutic eyewear frames.

FIG. 3 is a flowchart of method 300 of manufacturing therapeutic eyewear frames, in accordance with some implementations. At 302, negative ion powder is combined with plastic pellets to create a masterbatch. At 304, the masterbatch is loaded into an injection moulding machine. At 306, additional plastic pellets are loaded into the injection moulding machine, and added with the masterbatch. At 308, the combined mixture is injection moulded into one or more of the frame components (as described above), to form a therapeutic eyewear frame. At 310, the therapeutic eyewear frame is worn by a user for a sufficient period of time to interact with the negative ions emitted from the therapeutic eyewear frames, and to stimulate an improved sense of well-being.

The materials, techniques, processes and apparatuses described herein are applicable to any kind of eyewear, such as snow goggles, ski goggles, and motorcycle/automotive goggles. In some implementations, goggles use a flexible thermoplastic polyurethane as the pellet that is formed into a frame for the goggle lens(es).

Although a few embodiments have been described in detail above, other modifications are possible. Other embodiments may be within the scope of the following claims.

The invention claimed is:

1. A therapeutic eyewear frame comprising:
a frame front having a right end piece and a left end piece;
a right temple connected with the right end piece;
a left temple connected with the left end piece; and
a therapeutic agent integrated with one or more of the right temple, the left temple, and/or the frame front, the therapeutic agent having between 100 and 10,000 negative ions per cubic centimeter.

2. The therapeutic eyewear frame in accordance with claim 1, wherein the therapeutic agent includes negative ion powder applied to a plurality of plastic pellets prior to being injection-moulded as one of the right temple, the left temple, or the frame front.

3. The therapeutic eyewear frame in accordance with claim 1, wherein the therapeutic agent includes tourmaline powder.

4. The therapeutic eyewear frame in accordance with claim 1, wherein the therapeutic agent has approximately 2,000 negative ions per cubic centimeter.

5. The therapeutic eyewear frame in accordance with claim 1, wherein the frame front, the right temple, and the left temple are formed of plastic.

6. The therapeutic eyewear frame in accordance with claim 1, wherein the frame front, the right temple, and the left temple are formed of metal.

7. An apparatus comprising:
an eyewear frame having a frame front having a right end piece and a left end piece, the eyewear frame for supporting one or more lenses; and
a therapeutic agent integrated with the eyewear frame, the therapeutic agent having between 100 and 10,000 negative ions per cubic centimeter.

8. The apparatus in accordance with claim 7, wherein the eyewear frame is formed into a frame shape by injection molding, and wherein the therapeutic agent is a powder that forms at least part of a masterbatch for the injection molding to integrate the therapeutic agent with the frame shape.

9. The apparatus in accordance with claim 8, wherein the eyewear frame is formed of plastic.

10. The apparatus in accordance with claim 8, wherein the masterbatch includes tourmaline powder.

11. A therapeutic eyewear frame comprising:
a frame front having a right end piece and a left end piece, the frame front supporting and at least partially framing one or more lenses;
a therapeutic agent integrated with the frame front, the therapeutic agent having between 100 and 10,000 negative ions per cubic centimeter.

12. The therapeutic eyewear frame in accordance with claim 11, further comprising a right temple connected with the right end piece, and a left temple connected with the left end piece, and wherein the therapeutic agent is further integrated with the right temple and the left temple.

13. The therapeutic eyewear frame in accordance with claim 12, wherein the frame front, the right temple, and the left temple are formed of plastic.

14. The therapeutic eyewear frame in accordance with claim 12, wherein the frame front, the right temple, and the left temple are formed of metal.

15. The therapeutic eyewear frame in accordance with claim 11, further comprising a pair of nose pads, and wherein the therapeutic agent is further integrated with the pair of nose pads.

16. The therapeutic eyewear frame in accordance with claim 11, wherein the therapeutic agent includes tourmaline powder.

17. The therapeutic eyewear frame in accordance with claim 11, wherein the therapeutic agent has approximately 2,000 negative ions per cubic centimeter.

18. A method comprising:
providing a base material for an eyewear frame;
forming the eyewear frame from the base material, the eyewear frame being formed into at least a frame front for supporting and at least partially framing one or more lenses; and
integrating a therapeutic agent with the frame front during or after the forming, the therapeutic agent having between 100 and 10,000 negative ions per cubic centimeter.

* * * * *